United States Patent [19]

Jones

[11] 4,402,573
[45] Sep. 6, 1983

[54] MATERIALS FOR ELECTROCHROMIC DISPLAY DEVICES

[75] Inventor: Carol R. Jones, San Jose, Calif.

[73] Assignee: International Business Machines Corporation, Armonk, N.Y.

[21] Appl. No.: 274,988

[22] Filed: Jun. 18, 1981

[51] Int. Cl.³ ............................ C09K 9/02; G02F 1/17
[52] U.S. Cl. ...................................... 350/357; 252/600
[58] Field of Search ......................... 350/357; 252/600

[56] References Cited

U.S. PATENT DOCUMENTS

| | | | |
|---|---|---|---|
| 3,180,730 | 4/1965 | Klupfel et al. | 96/1 |
| 3,234,280 | 2/1966 | Fox et al. | 260/576 |
| 3,443,859 | 5/1969 | Rogers | 350/357 |
| 3,451,741 | 6/1969 | Manos | 350/357 |
| 3,567,450 | 3/1971 | Brantly et al. | 96/1.5 |
| 3,658,520 | 4/1972 | Brantly et al. | 96/1.6 |
| 4,139,276 | 2/1979 | Clecak et al. | 350/357 |
| 4,187,003 | 2/1980 | Barclay | 350/357 |
| 4,210,390 | 7/1980 | Yaguchi | 350/357 |
| 4,218,247 | 8/1980 | Hara et al. | 430/78 |
| 4,240,714 | 12/1980 | Wilbur | 350/357 |

FOREIGN PATENT DOCUMENTS 53-125278  11/1978  Japan ..................................... 350/357

*Primary Examiner*—Teddy S. Gron
*Attorney, Agent, or Firm*—Joseph G. Walsh

[57] ABSTRACT

A display device containing an electrochromic solution comprising a para substituted triphenylamine compound having the formula

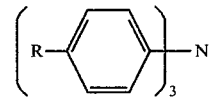

wherein R is lower alkoxy, lower alkyl or halogen.

4 Claims, No Drawings

MATERIALS FOR ELECTROCHROMIC DISPLAY DEVICES

DESCRIPTION

1. Field of the Invention

The present invention is concerned with electrochromic display devices. In particular, it is concerned with electrochromic display devices comprising in the electrochromic solution a para-substituted triphenylamine compound.

2. Background Art

Electrochromic display devices are well known in the art. See, for example, U.S. Pat. Nos. 4,187,003 and 4,240,714 and the references cited therein. In general, all electrochromic display devices comprise an electrochromic solution positioned between two electrically conductive electrodes, at least one of which is transparent. The electrochromic solution comprises an oxidant/reductant pair contained in a solvent along with a conductive salt. In operation, application of electrictiy to selected portions of the solution produces color change by producing an oxidation/reduction reaction causing a visible image to be displayed.

Several materials have been used in the prior art to change color upon the application of electrical current. Ideally, such materials should simultaneously possess a number of characteristics: (1) they should be intensely colored; (2) they should undergo the oxidation/ reduction reaction with complete reversibility, i.e. the system should show no fatigue; (3) the materials should be stable to water, to oxygen, and to change in temperature and ambient lighting conditions; (4) the material should have a large difference between the first and the second oxidation potential so as to permit rapid switching; and (5) the material must be able to undergo the redox reaction in a convenient solvent.

In one respect or another, all prior art materials of which we are aware fail to meet all the above requirements simultaneously to a completely satisfying degree. It is an advantage of the present invention that by using the materials of the invention, these requirements are achieved.

The para-substituted triphenylamine compounds used in the present invention are old materials. Their synthesis and some physical properties, including anodic oxidation and spectral characteristics of the oxidized and reduced compounds have been described in the scientific literature. The use of such materials in electrophotography has also been described. See, for example, U.S. Pats. No. 3,180,730; 3,234,280; 3,567,450; 3,658,520 and 4,218,247. As far as we are aware, however, nothing in the prior art suggests the use of these materials in electrochromic display devices.

SUMMARY OF THE INVENTION

According to the present invention, an electrochromic display device having very good properties is prepared with a solution comprising a para-substituted triphenylamine compound having the formula:

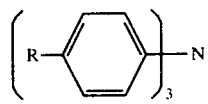

wherein R is a lower alkoxy, lower alkyl or halogen.

These compounds possess several unexpected advantages for use in electrochromic display devices. In particular, all the oxidized forms are intensely colored and yet the reduced forms are all colorless. Furthermore, they undergo the redox reaction with complete reversibility. Ambient laboratory conditions, including fluorescent lighting, have not affected the material. The compounds exhibit a large difference in their first and second oxidation potential. This large difference permits performing the oxidation at a relatively higher potential without destruction, and therefore, faster coloration is achieved. All the compounds are completely soluble in readily available organic solvents without the need to remove water and oxygen.

The expression "lower alkoxy" is intended to refer to groups having up to about four carbon atoms. In like manner, the expression "lower alkyl" is intended to include groups having up to about four carbon atoms. The most preferred compounds are those containing an alkoxy substituent, particularly the methoxy substituent. In a particularly advantageous embodiment of the present invention, the compound containing the methoxy substituent is used in a solvent which is 50% water and 50% acetone on a volume basis. Table I below shows electrochemical and spectral properties of some of the compounds useful in the present invention.

TABLE I

| $(R-\bigcirc)_3 N$ | Solvent$^a$ | $E_{\frac{1}{2}}^{1\,b}$ | $E_{\frac{1}{2}}^{2}$ | $\Delta E$ | $\lambda_{max}{}^c$ (oxid) | $E^d$ |
|---|---|---|---|---|---|---|
| R = CH$_3$O | CH$_3$CN | 0.52 | 1.21 | 0.69 | 723 | 25550 |
|  | H$_2$O—Acetone | 0.48 | — | — | — | — |
| CH$_3$ | CH$_3$CN | 0.75 | 1.54 | 0.79 | 674 | 23900 |
|  | H$_2$O—acetone | 0.76 | — | — | — | — |
| F | CH$_3$CN | 0.95 | 1.69 | 0.74 | 643 | 18000 |
| Cl | CH$_3$CN | 1.04 | 1.76 | 0.72 | 701 | 19200 |
| Br | CH$_3$CN | 1.05 | 1.79 | 0.74 | 734 | 24700 |
| I | CH$_3$CN | 1.01 | 1.67 | 0.66 | 794 | 25050 |

$^a$Solvent for electrochemical measurement;
$^b$In volts, superscript 1-first half wave potential, 2-second;
c. Absorption maxima of oxidized species - for compounds independently, chemically oxidized;
d. liter mole$^{-1}$ cm$^{-3}$.

The following Example is given solely for the purpose of illustration and is not to be considered a limitation on the invention, many variations of which are possible without departing from the spirit or scope thereof.

EXAMPLE 1

Tris-p-methoxyphenylamine was dissolved in a 50/50 acetone/water solution containing tetraethylammonium tetrafluoroborate and placed between a platinized platinum electrode and a transparent indium oxide electrode. Passing of an electrical current caused immediate precipitation of a dark blue-green material from the clear solution.

I claim:

1. In an electrochromic display device comprising a transparent front electrode, a back electrode in spaced relation to said front electrode, and an electrochromic solution contained between said electrodes, the improvement according to which the electrochromic solution comprises a para-substituted triphenylamine compound having the formula

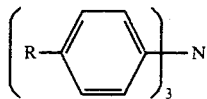
wherein R is lower alkoxy, lower alkyl or halogen.
2. A device as claimed in claim 1 wherein R is lower alkoxy.
3. A device as claimed in claim 1 wherein R is methoxy.
4. A device as claimed in claim 1 wherein the electrochromic solution comprises 50% - 50% acetone as the solvent.
* * * * *

UNITED STATES PATENT AND TRADEMARK OFFICE
CERTIFICATE OF CORRECTION

PATENT NO. : 4,402,573
DATED : September 6, 1983
INVENTOR(S) : CAROL R. JONES

It is certified that error appears in the above—identified patent and that said Letters Patent is hereby corrected as shown below:

Col. 4, line 6, "50% - 50% acetone" should read --50% water - 50% acetone--.

Signed and Sealed this

Twenty-second Day of November 1983

[SEAL]

Attest:

GERALD J. MOSSINGHOFF

Attesting Officer     Commissioner of Patents and Trademarks